United States Patent [19]

Cobbs, Jr. et al.

[11] Patent Number: 4,527,712
[45] Date of Patent: * Jul. 9, 1985

[54] METHOD AND APPARATUS FOR DISPENSING LIQUID COMPOSITIONS

[75] Inventors: Walter H. Cobbs, Jr., Amherst; William R. Rehman, Vermilion, both of Ohio

[73] Assignee: Nordson Corporation, Amherst, Ohio

[*] Notice: The portion of the term of this patent subsequent to Mar. 19, 2002 has been disclaimed.

[21] Appl. No.: 58,837

[22] Filed: Jul. 19, 1979

[51] Int. Cl.³ .............................................. B05B 7/16
[52] U.S. Cl. ...................................... 222/1; 222/145;
  222/146.2; 222/190; 222/239; 222/135;
  222/366; 222/144; 222/338; 222/427; 222/422;
  239/124; 239/135
[58] Field of Search ........ 222/146 HE, 146 H, 146 R,
  222/145, 1, 318; 239/124, 135; 418/15;
  261/DIG. 26; 219/421, 230, 296; 521/917;
  118/302; 427/422, 421, 373; 428/311, 315

[56] References Cited

U.S. PATENT DOCUMENTS

| | | | |
|---|---|---|---|
| 2,517,049 | 8/1950 | Stevens | 239/135 X |
| 2,590,442 | 3/1952 | Miller | 239/135 X |
| 2,763,575 | 9/1956 | Bede | 118/302 X |
| 2,980,339 | 4/1961 | Bok et al. | 239/135 |
| 3,800,985 | 4/1974 | Grout | 366/90 X |
| 3,820,718 | 6/1974 | Ammon | 239/135 |
| 4,045,185 | 8/1977 | Azemar et al. | 366/147 X |
| 4,059,466 | 11/1977 | Scholl et al. | 222/251 X |
| 4,059,714 | 11/1977 | Scholl et al. | 222/146 HE X |

FOREIGN PATENT DOCUMENTS 1386955  3/1975  United Kingdom ................ 366/338

Primary Examiner—Joseph J. Rolla
Assistant Examiner—Frederick R. Handren
Attorney, Agent, or Firm—Wood, Herron & Evans

[57] ABSTRACT

A method and apparatus for dispensing liquid compositions. The apparatus includes a reservoir for containing the liquid at a low temperature, a metering device for transferring the liquid to a circulating loop at a higher temperature, a heater/mixer for coincidentally heating and mixing the liquid in the loop and means for dispensing the liquid from the loop. The invention is particularly useful for dispensing liquid adhesive and coating compositions, including thermosetting polymers, heat sensitive polymers or plastisols and other dispersed liquid systems. In addition, mixtures of polymeric liquids with other components such as gases, solvents or liquid blowing agents may be employed with uniformity of composition for dispensing foams or atomizable paints.

17 Claims, 3 Drawing Figures

METHOD AND APPARATUS FOR DISPENSING LIQUID COMPOSITIONS

BACKGROUND OF THE INVENTION

Apparatus for dispensing liquids and hot melts are known. For example, in U.S. Pat. Nos. 4,059,714 and 4,059,466, methods are disclosed for making and using hot melt foamed adhesives which offer significant improvements over conventional non-foamed adhesives. According to the techniques described in these patents, the gas is intimately mixed with a thermoplastic adhesive while the adhesive is in a molten state and then the mixture is pressurized to form a solution which, upon dispensing at a lower pressure, releases the gas and foamed adhesive results. Foam coating methods are also disclosed in U.S. Pat. No. 4,156,754, in the names of Walter H. Cobbs, Jr. and Robert G. Shong and application Ser. No. 842,265, filed Oct. 14, 1977, now U.S. Pat. No. 4,247,581, in the names of Walter H. Cobbs, Jr., Robert G. Shong and William R. Rehman. Foam coating involves coating high polymeric materials by first foaming liquid containing film-forming solids, then conveying the foam toward a surface to be coated and forming a film or solids on the surface.

A wide variety of liquid compositions, mostly of a polymeric nature, are employed in the adhesive and coating techniques disclosed in these patents and applications. Generally, the liquid or polymeric components of the compositions are employed in a heated liquid state. Upon subjecting such compositions to heat, especially for prolonged periods, they tend to either degrade, cure or are otherwise heat sensitive. Furthermore, when a liquid coating or polymer is employed with a foaming agent, such as methanol, high temperatures for foaming are required, for instance, in the range of about 200°–235° F. with polyester paints in order to get good foaming and atomization. In such cases, a higher temperature will tend to cure catalyzed polyester paint within a relatively short period of time, i.e., about 1–2 hours. Often paint line operations require as high as 10 hours of duration with circulation of hot paint to the gun or applicator free of electrical heaters. Therefore, further improvements need be made that permit dispensing of such foamable compositions at satisfactory temperatures and for longer periods of time. It is also necessary to provide adequate mixing and uniform foam-volume ratios to allow processing of liquid foaming systems.

Other problems are encountered with heat sensitive liquids. For instance, organosols and plastisols are widely used throughout industry in many diverse applications. However, when such compositions are used with liquid dispensers, they exhibit heat sensitivity and tend to fuse or thicken. As a result, the fused or thickened material either clogs up equipment, causes equipment breakdown, or makes it difficult to maintain an effective and smoothly running liquid dispensing system.

The above brief background exemplfies the need for further improvements in dispensing liquids, melt compositions and heat sensitive liquids with compositional uniformity during dispensing or prolonged or workable periods.

SUMMARY OF THE INVENTION

This invention is directed to dispensing liquids, particularly hot liquids or heat sensitive liquids. More particularly, this invention is directed to dispensing polymer coatings under heat and pressure. Among other applications, the invention is particularly useful for mixing and dispensing uniform coating and foam compositions, such as curable paints, solvent-paint mixtures, organosols, and the like, which are heated or susceptible to heat and are difficult to process with controlled uniformity.

In one aspect of this invention, an improved system for dispensing hot liquid compositions is provided. The system includes a supply container for a liquid composition which is maintained at a relatively low temperature. The low temperature may be room or ambient temperature such that the liquid is not exposed to degradation, adverse reaction or the like. The supply container may also be maintained under atmospheric pressure or higher pressures, if necessary. Associated with the container is a means for transferring the composition to a circulating loop. The circulating loop is maintained at a substantially higher temperature and usually higher pressure. In the circulating loop, a small portion of the composition from the supply container may be transferred and maintained for dispensing. In the loop there is located a means for coincidentally heating and mixing the liquid composition during circulation. The coincidental heating and mixing of the liquid enables the obtainment of composititonal uniformity in processing without localized heating. Furthermore, the temperature is raised in the loop to the dispensing temperature as necessary for dispensing the hot liquid composition for adhesive or coating applications.

Employing the apparatus of this invention, foamable compositions may be brought to processing temperature from a lower storage temperature, transferred to a circulating loop in which the foamable composition is coincidentally heated and mixed for uniformity, under increased temperature and pressure, and, finally, the composition may be dispensed with control of the foam-volume ratio. Such a process and apparatus thereby enables a hot foamable composition to be processed continuously without degradation, curing or loss of volatile constituents and uniformly applied as a coating. Furthermore, the dispensing apparatus enables such foamable compositions to be stored, brought to a processing temperature with control of compositional liquid and blowing components in a heater-mixer loop and then dispensed through a suitable nozzle.

In another aspect of the invention, solvent-paint systems may be processed through a dispensing apparatus and furnished to an atomizing gun. In this case, the apparatus is employed with film-forming solids and solvents which are of a rather volatile nature to aid in atomization. Such solvent-paint mixtures are maintained in the supply container at a lower temperature and pressure, i.e., atmospheric pressure. From such a supply container, a portion is transferred to the circulating loop means wherein the solvent-paint mixture is processed under a higher pressure and temperature. Coincidental heating and mixing occurs in the loop and, thus, uniformity of composition is maintained. By such controlled heating and mixing, uniform compositions are capable of being sprayed upon release of pressure whereby the volatile component is above its boiling point at atmospheric pressure at the gun or dispensing orifice and aids in the application of the paint. The apparatus in this embodiment, therefore, performs a very useful function of enabling solvent-paint mixtures to be maintained without deterioration, transferred to a suitable spray-head and sprayed with uniform results.

In another feature of this invention, the transfer means from the container to the circulating loop is a pump which provides a desired flow rate to the circulating loop. In the circulating loop, a second pump is provided for circulating portions of the composition from the supply container or reservoir at a higher temperature and pressure. The circulating loop is isolated from the supply source by a suitable means such as a valve. The pump in the recirculating loop also enables the composition to be recirculated several times the flow rate used through the spray gun or dispensing head to maintain uniformity of composition in foam coating or solvent-paint coating.

The coincidental heating and mixing means may be either of the dynamic or static type. In the case of a dynamic mixer, a mechanically moving stirrer may provide the mixing element. In the case of the static mixer, it has been found preferred to employ a conduit heating and mixing means containing a number of relatively short elements of right and left-hand helices in the conduit with the walls of the conduit in heat transfer relationship with the liquid. These types of static mixers are disclosed in U.S. Pat. No. 3,800,985, for instance. The heater-mixer in the circulating loop provides, as pointed out above, a system to ensure adequate heating and mixing of components of the composition. For instance, where a foamable composition containing a film-forming liquid and a liquid blowing agent is provided to the closed loop system, recirculation through the heater-mixer enables adequate mixing of the components at the processing temperature for a sufficient period of time prior to dispensing. By closing off the circulating loop from the supply source maintained at a lower temperature, the supply containing a large amount of liquid need not be brought to temperature desired for adequate foaming of a portion thereof. Furthermore, employing the circulating loop of this invention, direct supply sources, heated hoses, heated guns and objectionable electrical connections, usually necessary in such spraying or coating operations, are avoided. In addition, where solvent-paint mixtures are employed for coating, the closed loop under heat and pressure enables maintenance of volatile solvent in the paint mixture as an aid in atomization. The apparatus is especially useful where the temperature in the loop is necessarily maintained above the normal boiling point of the solvent in accord with other unique aspects of this invention. In these circumstances, only a portion of the solvent-paint mixture needs to be transferred to the circulating loop for maintenance under heat and pressure with coincidental heating and mixing. Thus, employing this apparatus, significant improvements are obtained enabling liquids and rather heat sensitive compositions, such as foamable compositions and solvent-paint compositions, to be handled, dispensed to a spray gun for application to a surface with constant compositional uniformity.

Different metering devices may be employed in the transfer of the compositional components to the recirculating loop. For instance, from a supply container or source, a liquid composition may be introduced into the circulating loop through a metering block or valve. The metering block may also be supplied with other components from a different source such as liquid solvents or blowing agents whereby a composition comprising both the liquid and the solvent or blowing agent is introduced into the circulating loop from separate or different supply sources. Once in the circulating loop, temperature control means are provided such that the temperature of the entire composition throughout the system may be maintained at an operating level at which the coating composition is to be dispensed. The means for dispensing the coating composition from the circulating loop may simply be a nozzle as, for instance, is the case for an adhesive application. However, the dispensing means may be air or airless spray guns, the exact nature of which form no material part of this invention, and are well known to those in the art. Also, from the supply source, the liquid composition may be supplied or proportioned with other constituents through a proportioning pump into the circulating loop apparatus. In addition, a metering device which is simply an orifice for fluid flow control is all that is necessary to transfer the fluid compositions from the supply source into the circulating loop.

It will be appreciated in view of the above description that an improved system is provided for dispensing liquid polymeric compositions employing a novel combination of a liquid supply source operating at a low temperature and a circulating loop operating at a higher, or a dispensing, temperature. This combination enables heat sensitive liquid or polymeric compositions to be always maintained at a temperature well below that which would cause deleterious effects, as in the case of curable compositions. Therefore, thermosetting compositions are able to be processed with particular efficiency. Furthermore, as mentioned above, solvent-paint and foamable compositions containing volatile components are equally maintained at relatively low supply temperatures and brought to a processing temperature under pressure in the loop when desired. Only the portion of the composition which is going to be processed is introduced into the loop for application. Thus, this invention prevents pollution, conserves energy, and prevents deleterious effects on heat sensitive liquids, among its other attributes. The invention will be further understood in view of the following detailed description.

DETAILED DESCRIPTION

Figure 1:
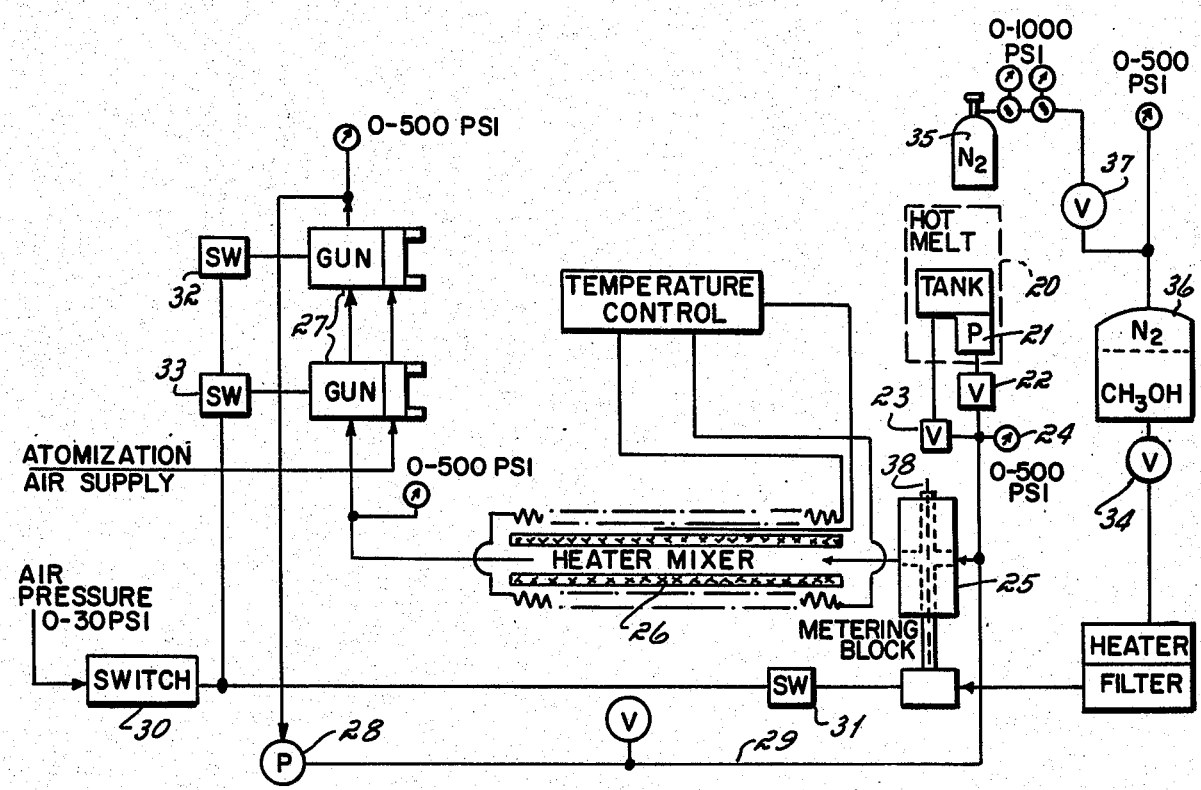
FIG. 1 shows schematically the apparatus of the invention.

Liquid compositions which may be dispensed according to this invention include coating and adhesive compositions which comprise liquid film-forming or polymeric components. The polymeric component may range from a liquid, to a semi-solid paste, to solid under normal conditions. Under the action of heat, liquidity may be achieved. Where the liquids are foamable, they may contain either solid or liquid film-forming components. The liquid state of the foam, or film-forming solids, may be enhanced by the application of temperature and, as such, hot melt foam compositions may be dispensed according to the process of this invention. In the hot melt form or ambient liquid form, the liquids may contain either thermoplastic or thermosetting resinous compositions. Polymeric compositions can be obtained in liquid form, without the addition of solvents or other liquid diluents as by melting, for example. Common resins of the industrial coatings industry without solvents are therefore suitable including syrups of methacrylates, acrylates and copolymers thereof, alkyd resins, polyester resins, polyurethanes, epoxies, coating grade polyethylenes, ethylene vinylacetate copolymers, polyvinylchlorides, various rubber compositions and the like. The coating and finishing resins presently primarily in use are alkyd polyester resins or polyesters. In this regard, the term "alkyd" polyester resin is intended to include those resins which are modified polyester resins, usually oil modified resins. "Polyester resins" are the synthetic resins derived from poly-functional alcohols or acids. The next most important resin for present industrial coating is made up of mainly acrylic polymers and copolymers, with the balance of the market comprising vinyls, epoxies, polyurethanes, aminos, cellulosics and other similar resins. Therefore, it is to be understood that a film-forming component of the liquid compositions of this invention includes a wide variety of polymeric components of the type just mentioned and well understood by those skilled in the arts of the paint and coatings industry. The principal polymeric composition which may be employed in any of the methods defined above depends upon the end use of the composition, whether for coating, adhesive structural purposes, and so forth, as will be understood to a person of ordinary skill in the art. Sources existing in the surface coatings literature to illustrate the specific types of coatings for particular domestic or industrial applications include the handbook of "Surface Coatings" prepared by the Oil and Color Chemists' Association, Australia, in conjunction with the Australian Paint Manufacturers' Federation, the New South Wales University Press, 1974; Treatise on Coatings, Col. 4 (in two parts entitled "Formulations", Part I, edited by R. R. Myers and J. S. Long, Marcel Dekker, Inc., 1975); and "Paint Finishing in Industry" by A. A. B. Harvey, Second Edition, Robert Draper, Great Britain (1967). These sources are included herein by reference for more detailed disclosures of compositions and coating techniques which may be used according to the principles of this invention.

Another class of liquid compositions which may be dispersed with apparatus of this invention includes plastisols or organosols. A plastisol is a suspension or dispersion of small particles of a polymeric substance in a liquid plasticizer for the polymeric substance. A plastisol contains no volatile thinners or diluents. Plastisols often contain stabilizers, fillers and pigments, but all ingredients have low volatility during processing and end use. Closely associated with plastisols are organosols. Organosols are dispersions extended with organic volatiles which are removed during fusion of the polymeric material. The most commonly useful polymeric substance for plastisols is polyvinyl chloride and its copolymers such as vinylacetate, acrylate and maleate. Further examples of plastisol systems include polyvinyl butyral, cellulose acetate butyrate, polyvinylidene fluoride, polymethyl methacrylate and others from the list of polymers described above. A reference on plastisol and organosol compositions in general, for inclusion herein, is "Plastisols and Organosols", edited by Herald A. Sarvetnick, Van Nostrand Reinhold Company, 1972 Library of Congress Catalog No. 75-151258, Chapter 6, pages 83–105.

Other liquid compositions which may be processed according to this invention are thermoplastic materials employed for coating, adhesive, or structural purposes. A "thermoplastic material", as that term is used and understood to those skilled in the art, includes any natural or synthetic thermoplastic polymer or polymeric compositions. A thermoplastic material is a normally solid or semi-solid material at use temperatures and it melts or liquifies upon heating to a higher temperature. Upon cooling the material solidifies or returns to a solid or semisolid state. As also used in this description, the term "thermoplastic hot melt adhesive" or "hot melt adhesive" is a term which is well known in the art and this material has the same characteristics of liquification upon heating and, upon cooling, solidification to a solid, semi-solid or tacky state. Examples of thermoplastic materials include polymers of ethylenically unsaturated monomers, such as polyethylene, polypropylene, polybutylenes, polystyrenes, poly($\alpha$-methyl styrene), polyvinyl chloride, polyvinyl acetate, polymethyl methacrylate, polyethyl acrylate, polyacrylonitrile and the like; copolymers of ethylenically unsaturated monomers such as copolymers of ethylene and propylene, ethylene and styrene, and polyvinyl acetate; styrene and maleic anhydride; styrene and methyl methacrylate; styrene and ethyl acrylate; styrene and acrylonitrile; methyl methacrylate and ethyl acrylate and the like; polymers and copolymers of conjugated dienes such as polybutadiene, polyisoprene, polychloroprene, styrenebutadiene rubber, ethylene-propylene-diene rubber, acrylonitrile-styrene butadiene rubber and the like; saturated and unsaturated polyesters including alkyds and other polyesters; nylons and other polyamides; polyesteramides and polyurethanes; chlorinated polyethers, epoxy polymers, cellulose esters such as cellulose acetate butyrate, and the like. The term "thermoplastic material" is sometimes used herein interchangeably with "hot melt", "melt", "hot melt thermoplastic" or "hot melt adhesive". It is, of course, to be appreciated that all these compositions are characterized by their thermoplastic nature as above defined. A number of thermoplastic or hot melt adhesive compositions may be employed. These and other materials are sometimes identified by trademarks. However, certain of such trademarked materials are defined in *The Condensed Chemical Dictionary*, 8th Edition, Revised by G. G. Hawley, Von Nostrand Reinhold Company, Library of Congress Cat. Card No. 75-133848 (1971). Thus, these definitions are incorporated herein by reference. For example "ELVAX" is a copolymer of ethylene vinylacetate (EVA) dy DuPont. A conventional polyethylene based adhesive composition is "Eastabond A-3", manufactured by Eastman Chemical Company. In addition, "AC 635" is another polyethylene based composition by Allied Chemical. "Terrell 6100" is a polyester composition and "A-FAX 500" is a polypropylene polymer by Hercules. Polyamides are sold under the trademark "Versalon 1138" by General Mills.

Where foamable compositions are dispersed in the practice of this invention, the ratio of volume occupied after foaming to volume occupied before foaming is termed "foam-volume ratio". This ratio is usually controlled, ranging up to about 50:1. Depending upon the use of the foamed material, i.e., either as a paint, adhesive, etc., the foam material may be end-processed in a number of different manners. For instance, in the coating area, depending upon the method of coating conveyance, the composition will undergo different mechanisms of disintegration in film-forming upon a substrate. Where atomization and spraying are the modes of conveyance, foam disintegration will be initiated and occur prior to film-forming solids being deposited upon the substrate. In this instance, the ease of atomization of such high polymeric liquid is accomplished by reason of the energy that is stored in the liquid surface of the foam bubbles. In another form, however, foams of high polymeric solids may first be deposited upon a substrate by a suitable technique and disintegration thereon to form a continuous film coating from the film-forming solids. Further details of such methods may be had by reference to Cobbs et al application Ser. No. 842,265, filed Oct. 14, 1977 and entitled "Foam Coating" which is incorporated herein by reference.

In practicing the process of this invention, therefore, with certain of the above liquid foamable or solvent-paint compositions, the compositions are heated under pressure in the loop, and thereafter dispensed. In this method and apparatus, the conditions are controlled such that usable foam-volume ratios or solvent-paint compositions are employed. Stabilization of foamable compositions may be effected by employing surfactants as developed in U.S. Pat. No. 4,156,754 of Cobbs et al. Where foamable compositions are dispersed, in general, the amount of liquid or gas blowing agent mixture is chosen from about 0.05% to 5%, preferably about 1 to about 3% by weight of the liquid composition or polymeric material contained therein. In solvent-paint applications, the volatile solvent component is contained usually in amounts of 2 to about 35% by volume. It will be understood that the range of the liquid blowing agent or solvent suitable for use in a particular composition will be governed by the need to achieve satisfactory results as will be understood by one of ordinary skill in the art in view of this description. Reference again may be had to FIG. 3 of Cobbs et al U.S. Pat. No. 4,156,754 for the generalized situation in foam compositions. Exemplary of liquid foaming or solvating agents are isopropanol, acetone, methanol, butanol and the like. The foaming agent may also be a solid or gas. A number of compounds may be employed to provide the gas-forming agent in order to foam a liquid according to the principles of this invention. Included in such gas or gas-forming agents are azodicarbonamides, air, nitrogen, oxygen, carbon dioxide, methane, ethane, butane, propane, helium, argon, neon, fluorocarbons such as dichlorodifluoro methane, monochloro trifluoro methane, or other gases, or mixtures of any of these gases.

In the case of foamable liquids or solvent-paints, the mixture of the liquid composition or resin with liquid blowing agents or solvents is usually heated in the loop to a temperature substantially above the boiling point of the liquid or a solvent. Simultaneously the mixture is pressurized to a pressure at least high enough that it exceeds the vapor pressure of the liquid blowing agent or solvent at that temperature. This pressurized mixture is then dispensed either to foam or to volatilize by release of pressure to atmospheric pressure or below with the temperature maintained above the boiling point of the liquid or a solvent. When foam is dispensed, it may then of course be used by application to a substrate, or between substrates for bonding, by dipping, spray atomization, roll coating, or extrusion such as in structural foam formation, etc. When solvent-paint mixtures are dispensed, they may be used by air atomization or airless atomization.

In the use of thermosetting coating compositions, this invention obtains certain unique advantages as mentioned above. For instance, as mentioned, polyester resin coating compositions are most widely employed in the industry. When a polyester resin is cured or cross-linked with hexamethoxymethyl melamine, or a similar curing agent, such as tetramethoxymethyl urea, methanol is the by-product of the reaction. The method and apparatus of this invention enables thermosetting resins to be processed efficiently. In a preferred practice of this invention, methanol is introduced in a very minor amount as the foaming or volatile agent. Methanol has a very favorable vapor pressure for foaming of polyester resins and it is sufficiently soluble to produce a high quality foam formation. In this broader aspect, this invention therefore employs a liquid or blowing agent or solvent which is a by-product of the thermosetting resin reaction and, thus, also by suppression of that reaction enables control of curing times while the foam coating is being conveyed and finished on a surface. This is advantageous in allowing for additional hold-up, storage, loop circulation and processing times of thermosetting coating compositions.

Figure 2:
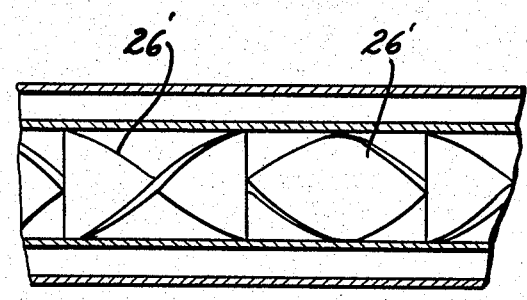
FIG. 2 shows a static-type mixer which may be used in the apparatus.
Figure 3:
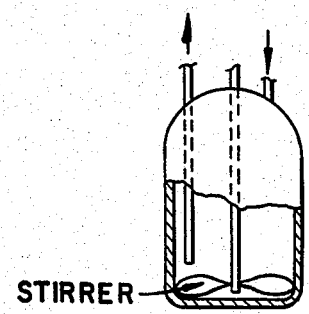
FIG. 3 shows a dynamic-type mixer which may be used in the apparatus.

The principles of this invention will be further understood with reference to the following detailed examples and the drawing. Referring to FIG. 1 of the drawing, an apparatus is diagrammatically illustrated for the purpose of practicing the invention. Liquid or paint formulations are placed in the hot tank unit 20 and usually brought to 120°–150° F. by that unit. Air pressure is supplied to the motor in this unit driving the gear pump 21 and valve 22 is opened. A valve 23 is adjusted to provide a minimum flow through pump 21 for stable pressure reading on output line gauge 24. Viscous high solids paint thus flows through lines (pipes) as indicated by the arrows to the metering block 25 and through this block into the heater-mixer unit 26. The mixer itself can be of the static type disclosed in U.S. Pat. Nos. 3,286,992; 3,664,638; 3,704,006 and 3,800,985. With reference to FIG. 2, the mixer shown in cross-section is preferably constructed of a number of short ($\frac{1}{4}$ inch) elements (21 in number) of right and left-handed helices 26', as mentioned above and described in the last mentioned patent. It may be heated electrically or by heat exchange fluids. FIG. 3 shows a dynamic mixer including a mechanically moving stirrer which may be employed instead of the static mixer illustrated by FIG. 2. The paint then flows through this unit into the lines of the guns 27, thence to the return line and into the gear pump 28. This pump returns the paint through the loop return line 29 to the metering block inlet. The temperature controller supplies heat as needed to the heater-mixer 26 raising the temperature of paint in the loop to the value selected. Temperatures from 160° F. to 230° F. may be used. When the loop has come up to operating temperature, including the guns and all lines, the pneumatic air switch 30 is operated on along with air valves 31 and either or both air valves 32, 33. Volatile solvent or blowing agent, such as methanol, flows via valve 34 into the metering block under a pressure difference set with the regulator on the nitrogen tank 35 applied to the Greer bottle diaphragm 36 through lines and valve 37. Typically the pressure difference is set for 100 psi, with the pressure at the Greer bottle being 100 psi higher than the paint pressure at the inlet to the metering block 25. When the methanol is metered into the paint, the fluid is allowed to flow out the gun(s) which are turned on also by switch 30; circulation in the loop and flow out from the guns both take place simultaneously. Adjustments to pumps 21 and 28 are made to give the desired flow rate from the gun(s), typically 5 oz./min. by weight. Recirculation occurs in the loop from about 4-12 times the flow through the gun(s), i.e., typically 20-60 oz./min. by weight flow in the loop. The wire 38 in the metering block 25 may be adjusted to meter solvent at fixed rates from 2-10 grams/minute so as to give the desired percent solvent or blowing agent, e.g., in the paint (2 to 5 percent). However, fine adjustment is made by varying the difference in pressure between the Greer bottle methanol reservoir 36 and the paint inlet pressure at metering block 25.

If desired, samples of paint from the gun may be taken in a 150 cc cup and weighed to determine minimum foam temperature and ratios. By setting the pressure as above, stable metering and flow operation occur with constant flow of paint from the gun(s). When conditions have been established, air is supplied to the gun air caps and paint at the nozzle of the guns is atomized. Black paper cuts are made to prove atomization by comparison with industrial standards. Instead of supplying methanol from the Greer bottle, methanol can be introduced into the paint at or before placement in the tank unit. In the latter case, valve 34 is turned to off, otherwise procedure is same as above.

EXAMPLE 1

The apparatus of the drawing was operated for spraying an epoxy paint formulation prepared using the materials listed below:

| | |
|---|---|
| Shell Epon 1001* | 2602.8 grams |
| Shell Epon 828* | 162.0 grams |
| Hexamethoxymethyl melamine | 122.4 grams |
| Methanol | 32.4 grams |

(*low molecular weight condensation polymers of epichlorohydron and bisphenol-A)

Following essentially the procedure described in connection with the drawing, the epoxy paint was placed in the tank unit of the loop apparatus, brought to operating temperature as hereinafter specified, under about 100 p.s.i.g., and sprayed using air atomization with a heated, thermostated gun. The flow rate was adjusted to approximately 5 oz./minute and cuts were made with black paper through the spray pattern a few inches from the nozzle. The minimum foaming temperature point was determined to be 180°-185° F.; that is the lowest temperature at which foaming could be detected by visual observation of bubbles in the liquid stream issuing from the fluid nozzle. The best atomization was obtained at 225° F. with a foam ratio by volume at 14/1 to 9/1, and very good panels were made. The temperature was then lowered to 175° F. At this temperature with no foaming, atomization was not as good as at 225° F. Test panels were also good when baked for 20 minutes at 350° F. This example thus illustrates the atomization of the film-forming resin solids by maintaining a minor amount of a volatile solvent under heat and pressure at a temperature above its normal boiling point and below or above the foam temperature of the composition. On release of pressure to atmosphere upon passing through a spray orifice, atomization occurs with external air atomization means.

EXAMPLE 2

An apparatus essentially like that of the drawing was operated for spraying the following ingredients formulated on a percent by weight basis:

12.7% VYLF Union Carbide, resin, i.e., copolymer of vinyl chloride and vinyl acetate in a ratio of 88:12
12.7% Hexamethylmethoxy melamine
47.2% Dioctyl Phthalate plasticizer
0.3% Thermolite 49 Stabilizer (M & T Chemicals)
0.4% Thermolite 31 Stabilizer (M & T Chemicals)
25.4% $TiO_2$
1.3 Methanol The above vinyl resin, hexamethylmethoxy melamine and $TiO_2$ were mixed together in a container and agitated at high speed. While under agitation, the stabilizers above mentioned were added near the start of the grind to avoid degradation due to heat. After approximately 30 minutes, the mixture was reduced with the plasticizer and methanol. Whereupon the mixture was again agitated until a thorough blend was achieved. The viscosity by ASTM D3236 was 2090 cps (without methanol) at 200° F. After introduction into the tank unit at about 125° F., the paint was transferred to the loop and brought to operating temperature as hereinafter specified, at about 100 p.s.i.g., with continuous circulation. The minimum foam point was determined by visual observation of bubble formation in the liquid from the fluid nozzle, to lie between about 20° F. and 210° F. Black paper cuts were taken through the spray patterns from both air spray and airless spray guns at a temperature above the minimum foam, e.g., 225° F., and a temperature below the foam point, e.g., 200° F. Atomization for both air spray and airless spray was noticeably better at 225° F., above the minimum foaming temperature. However, good panels were sprayed at a flow rate of 4.6 oz./min. at both 225° F. and 200° F. Airless results were obtained using a hydraulic pressure of 900-1000 p.s.i.g. and a Nordon Corporation airless 000910 nozzle w/09 TP.

EXAMPLE 3

An apparatus similar to that illustrated in the drawing was also employed in this example. An acrylic enamel extended with polyester resin was formulated by combining the following components on a weight basis.

| | |
|---|---|
| Acrylic Resin (Dupont, "Elvacite" EP2028) | 261.9 |
| Acrylic-Polyester Resin Castolite-AF (The Castolite Company) | 1900.7 |
| Hexamethylmethoxy Melamine | 930.1 |
| Titanium Dioxide | 2479.2 |
| Silicone Surfactant | 8.6 |
| Methanol | 108.4 |

The viscosity of this formulation was determined to be 1100 cps at 200° F. by ASTM D3236. The formulation was placed in the tank at about 150° F. and then transferred to the loop apparatus at operating temperature as hereinafter specified, under about 200 p.s.i.g., with circulation. The minimum foaming temperature was determined by observing bubbles visually in the liquid from the gun nozzle and was found to be between 175° F. and 180° F. The material was air sprayed at about 215° F. and cuts with black paper were made to show the results. After cooling down below the minimum foaming temperature, cuts were again made by air spraying at about 173° F. These cuts showed break-up to be better above the minimum foaming temperature than below it. However, acceptable panels were made by both techniques and air dried.

EXAMPLE 4

Three formulations were prepared for evaluations in an apparatus substantially the same as that described above. These are designated nominally 5% acetone; 5% acetone—5% ethyl "Cellosolve" acetate, and 10% acetone because of the volatile solvent component in each. The complete formulations are given below. The catalyst is 25% dinonyl naphthalene disulfonic acid in alcohol.

| I. 5% Acetone | | |
|---|---|---|
| (1) Polyester Resin | 2077.5 | grams |
| (2) TiO$_2$ | 2375.0 | grams |
| (3) Hexamethoxymethyl melamine | 890.5 | grams |
| (4) Silicone surfactant | 9.0 | grams |
| (5) Catalyst | 23.7 | grams |
| (6) Acetone | 268.8 | grams |
| II. 5% Acetone - 5% Ethyl Cellosolve Acetate | | |
| (1) Polyester Resin | 2077.5 | grams |
| (2) TiO$_2$ | 2375.0 | grams |
| (3) Hexamethoxymethyl melamine | 890.5 | grams |
| (4) Silicone surfactant | 9.0 | grams |
| (5) Catalyst | 23.7 | grams |
| (6) Acetone | 268.8 | grams |
| (7) Ethyl Cellosolve Acetate | 268.8 | grams |
| III. 10% Acetone | | |
| (1) Polyester Resin | 2077.5 | grams |
| (2) TiO$_2$ | 2375.0 | grams |
| (3) Hexamethoxymethyl melamine | 890.5 | grams |
| (4) Silicone surfactant | 9.0 | grams |
| (5) Catalyst | 23.7 | grams |
| (6) Acetone | 537.6 | grams |

The polyester resin used in these formulations is made from a mixture of dibasic acids and a mixture of dihydric and trihydric polyols. The dibasic acids are combinations of ortho or isophthalic acid and adipic acid or azelaic acid. The trihydric alcohols can be glycerine, trimethylol ethane, or trimethylol propane, and the dihydric alcohols can be ethylene, propylene, neopentyl or trimethylpentanediol. There can be minor amounts of monobasic acids of the saturated types such as coconut fatty acid, pelargonic acid, benzoic acid or paratertiary butyl benzoic acid used. Ethyl "Cellosolve" acetate is a trade name for ethylene glycol monoethyl ether acetate.

Each formulation material was placed in the tank unit of the drawing and brought to the entry temperature of about 150° F.; from there it was pumped into the circulation loop where it was circulated by means of the gear pump, the whole loop circuit being maintained at about 100 p.s.i.g. In this procedure the heater-mixer comprised two heater-mixers of the type described above. These mixers were heated by immersion in a thermostated oil bath with separate oil circulation and control. The spray gun for air spray of the material was fed by hot melt hoses, both being within the loop flow system. The hoses were electrically heated and thermostatically controlled at the loop temperature; the gun was also similarly controlled at the same temperature as specified hereinafter. Samples were sprayed at chosen temperatures and black paper cuts were made for each sample with results summarized in the Table below.

TABLE

| Formulation Used | 0-10 Quality/Temperature °F. | | | |
|---|---|---|---|---|
| I. $\frac{5\% \text{ Acetone}}{\text{Foam Temp.} = 210° F.}$ | 2/190° F. | 4/205° F. | 6/218° F. | 8/222° F. |
| II. $\frac{5\% \text{ Acetone} \cdot 5\% \text{ Ethyl Cellosolve Acetate}}{\text{Foam Temp.} = 185° F.}$ | 3/156° F. | 5/175° F. | 7/196° F. | 9/220° F. |
| III. $\frac{10\% \text{ Acetone}}{\text{Foam Temp.} = 170° F.}$ | 4/163° F. | 6/173° F. | 8/181° F. | |

On the scale of 0–10, a value of 2 means the atomization was usable and, as the values increase from 2 to 10, the results become better to superior at a value of 10. Thus, these results show that the foam temperature varies for the particular solvent employed and its amount. However, below the foam temperature, usable and good atomizations were achieved. Generally, the quality of the atomization was better above foam point. However, these examples demonstrate that below the foam point but above the boiling point of the low boiling solvent, atomization can be achieved with minimal amounts of solvent. Thus, resin solids can be sprayed from about at least about 65–80% by weight and even up to 92–3% or more, utilizing the principles of this invention. It is to be understood that flow out onto the panels will be improved by the inclusion of a higher boiling solvent. In this case, 5% ethyl Cellosolve acetate has a boiling point of about 156° C., or well above the boiling point of acetone or the foam point of 185° F. However, the presence of the high boiling solvent lowered the foam temperature of 5% acetone from 210° F. to 185° F. and its presence also enhances the flow out onto sprayed panels.

EXAMPLE 5

An apparatus substantially the same as that described above was employed for spray coating of the following epoxymelamine-high solids can coating.

| | | |
|---|---|---|
| Shell Eponex DRH 151-1 Resin* (Pretreated with H$_3$PO$_4$ in 65.2 grams isopropanol) | 1856.6 | grams |
| Hexamethoxymethyl melamine | 1508.1 | grams |
| Monsanto Modaflow (acrylophosphoester processing aid) | 7.3 | grams |
| Catalyst 3525 (25% dinonyl naphthalene disulfonic acid in alcohol) | 30.0 | grams |
| Ethyl Cellosolve Acetate | 150.0 | grams |
| Acetone | 150.0 | grams |

*This resin is an isopropylidenedicyclohexanol-epichlorohydrin resin

The above resins were placed in a one gallon pail and mixed with a mechanical stirrer for about 20 minutes. Then, the other ingredients of the formulation above were added with continued mixing for about 15 minutes. The viscosity of the total mixture was measured and the solids content determined by weight loss at about 225° F. for two hours. Volume solids were found to be about 75.8%. Then, the foam temperature was determined on a portion of the formulation and found to be about 217° F. Upon employing the loop apparatus in substantially the same way as described above, with an airless spray gun, at an operating temperature of about 210°–215° F. under a pressure of about 800 p.s.i.g., test panels of aluminum and tin plated steel were sprayed. On the tin plated steel, coating weights varied from about 18.2 to about 56.0 grams on 8 square inches of panel. The coating qualities were very good with excellent flow out. The above tests were repeated with a number of different nozzles and restrictors with an operating temperature set below the minimum foam temperature, namely at about 210°–215° F. Very acceptable coating weights and distribution on beverage can surfaces were obtained.

The above example contained a mixed solvent system of acetone, isobutanol and isopropanol. The mixture normally boils at 98°–102° C. However, as stated above, the gun was set for operation above the boiling point under a pressure of approximately 800 p.s.i.g., but below the minimum foam temperature of the composition. Under these conditions, airless atomization of the coating formulation at approximately 75% volume solids was achieved with good efficiency.

EXAMPLE 6

For the purpose of dispensing a liquid containing a gas blowing agent in the apparatus illustrated in the drawing, a low molecular weight polyethylene polymer having a low melting point of about 180°–280° F. was introduced into the tank and melted. The polyethylene is normally a white crumbly solid and is sold under the trade designation DYDT polyethylene by Union Carbide. After melting in the tank, the polyethylene composition was pumped to the circulating loop through the metering block. At the metering block, carbon dioxide gas was introduced from the supply source in the same manner as methanol described above. The circulating loop was operated at a temperature of about 260° F. and pressure of about 45 p.s.i.g. The carbon dioxide pressure as supplied was about 600 p.s.i.g. The above conditions enabled the apparatus to yield samples of foam at approximately 6:1 foam ratio. The foam dispensed was suitable for adhesive applications and was maintained with compositional uniformity.

EXAMPLE 7

Referring to the drawing, a polyester paint composition was formulated and charged into the pressure pot through the inlet. The ingredients of the composition were:

| (1) Polyester Resin | 415.5 parts |
|---|---|
| (2) TiO$_2$ | 475.0 parts |
| (3) Hexamethoxymethyl melamine | 178.1 parts |
| (4) Silicone surfactant | 1.8 parts |
| (5) Catalyst | 3.0 parts |

The polyester resin paint composition employed above as 100% solids consisting essentially of adipic and phthalic acids polymerized with propylene glycol and trimethylol propane. The paint composition above detailed was introduced into the tank at about 150° F. and then to the loop for maintenance under a temperature less than about 200° F., e.g., at about 185° F. In foaming the polyester paint from the loop, the paint is mixed with a fixed quantity of the liquid blowing agent, i.e., either the butane, propane, and mixtures of the two through the metering block. Where the paint/foaming agent mixture in the loop has equal ratios of butane and propane in it and at 2.1% total weight, a pressure of about 200 p.s.i.g. was employed in the loop. A foam ratio by volume of 12.9:1 was achieved upon dispensing. When the polyester paint composition is spray-coated onto a substrate, the foam is passed under pressure to the entrance port of a spray unit, for instance a Model 61 Binks air spray unit. For instance with a nozzle of 0.052 inch diameter, the foam issues at a temperature of 220° F. and at a rate of about 2 oz. per minute. A pressure of 40–50 p.s.i.g. may be applied to the air intake of the spray unit, whereupon the foam paint composition is atomized and conveyed to a substrate, where it may then be cured by heating to a solid film.

In view of the above detailed description, other embodiments of the invention will become apparent. Such variations to achieve the advantageous results of this invention will be understood to those of ordinary skill in the art in view of the above description.

We claim:

1. An apparatus for dispensing foam coating compositions comprising
    a container for storing liquid composition comprising a film-forming solid,
    means for transferring a portion of said liquid composition to a separate loop maintained under pressure for circulating said liquid portion mixed with a blowing agent,
    means for separately supplying the blowing agent to said loop,
    a single unit for coincidentally heating and mixing said liquid composition and blowing agent mixture in said loop at a temperature above the foaming point of said blowing agent, said composition being maintained under pressure in said loop, said single unit including a means in the loop for imparting heat to said liquid mixture and baffles for causing mixing of said liquid mixture, and
    means for selectively dispensing the composition from the circulating loop to normal atmospheric conditions for foaming said composition and forming a coating upon a substrate with said film-forming solids.

2. The apparatus of claim 1 in which the dispensing means comprises an atomization device.

3. The apparatus of claim 1 which comprises a pump for transferring the liquid portion to the loop.

4. The apparatus of claim 3 further comprising a pump for circulating the liquid portion in said loop.

5. The apparatus of claim 1 in which said single unit comprises a conduit containing a number of fixed right and left-hand helices and the walls of the conduit being in heat transfer relationship with the liquid.

6. A method for dispensing solvent-coating compositions comprising
    providing a liquid composition comprising a solvent and film-forming solids,
    transferring a portion of said liquid composition to a separate loop maintained under pressure for circulating said liquid portion,
    separately metering said solvent and said film-forming solids of said composition to said loop,
    employing a single unit for coincidentally heating and mixing said liquid portion in said loop at a temperature above the normal boiling point of at least a portion of said solvent, said single unit including a means in the loop for imparting heat to said liquid portion and baffles for causing mixing of said liquid portion, maintaining said portion under pressure in its liquid state in said loop, and selectively dispensing the composition from the circulating loop to normal atmospheric conditions for evaporation of said solvent portion and for coating a substrate with said film-forming solids.

7. The method of claim 6 which comprises dispensing said composition by atomization and spraying.

8. The method of claim 6 wherein said liquid composition contains polymeric film-forming solids.

9. A method for dispensing foam coating compositions comprising storing a liquid composition comprising a film-forming solid, transferring a portion of said liquid composition to a separate loop maintained under pressure, separately supplying a blowing agent to said loop, circulating said liquid portion in said loop mixed with said blowing agent, employing a single unit for coincidentally heating and mixing said liquid composition and blowing agent mixture in said loop at a temperature above the foaming point of said blowing agent, said composition being maintained under pressure in said loop, said single unit including a means in the loop for imparting heat to said liquid mixture and baffles for causing mixing of said liquid mixture, selectively dispensing the composition from the circulating loop to normal atmospheric conditions for foaming said composition, and forming a coating upon a substrate with the dispensed film-forming solids.

10. The method of claim 9 which comprises dispensing said composition by atomization.

11. The method of claim 9 wherein said blowing agent is normally a liquid and the temperature in the loop is above the boiling point of said liquid.

12. The method of claim 9 wherein said liquid comprises a thermosetting resin composition.

13. The method of claim 12 wherein said thermosetting resin is a polyester resin.

14. The method of claim 13 wherein said liquid blowing agent is a by-product of a thermosetting reaction of said resin.

15. The method of claim 14 wherein said liquid blowing agent is methanol.

16. The method of claim 9 wherein said liquid composition is a hot melt adhesive and said coating is formed upon the substrate for adhesive purposes.

17. The method of claim 16 wherein said hot melt adhesive contains a thermoplastic material selected from the group consisting of polyethylene, polypropylene, polybutylene, polystyrene, poly($\alpha$-methyl styrene), polyvinyl chloride, polyvinyl acetate, polymethyl methacrylate, polyethyl acrylate, polyacrylonitrile, copolymers of ethylene unsaturated monomers, polybutadiene, polyisoprene, polychloroprene, styrene butadiene rubber, ethylene-propylene-diene rubber, acrylonitrile-styrene butadiene rubber, polyesters, polyamides, polyesteramides, polyurethanes, chlorinated polyethers, epoxy polymers, cellulose esters and blends of any said materials.

* * * * *